Nov. 15, 1955 H. S. REESE ET AL 2,723,835
ICE HOLE CUTTER
Filed Sept. 9, 1954 2 Sheets-Sheet 1
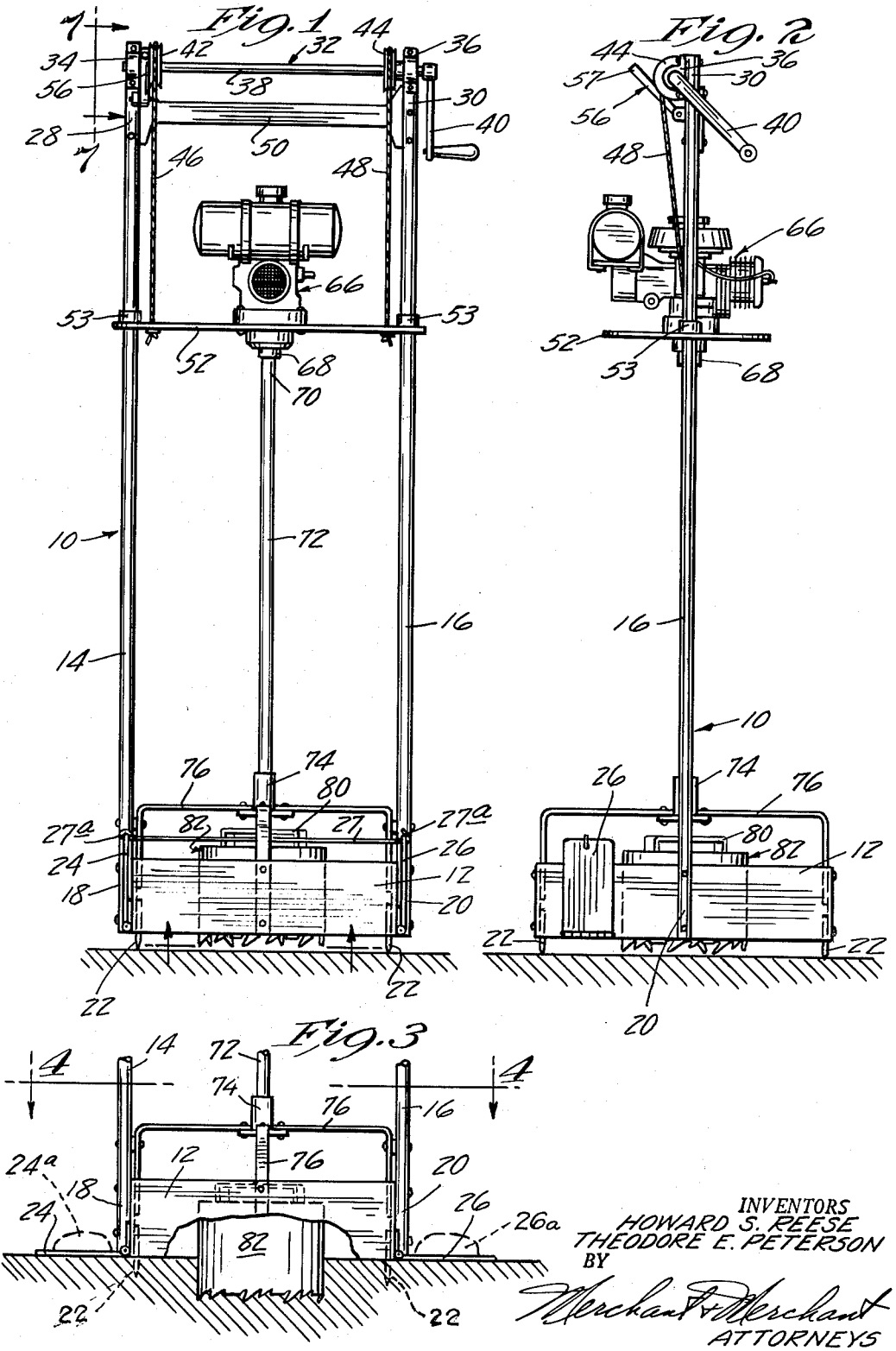
INVENTORS
HOWARD S. REESE
THEODORE E. PETERSON
BY
Merchant & Merchant
ATTORNEYS Nov. 15, 1955     H. S. REESE ET AL     2,723,835
ICE HOLE CUTTER
Filed Sept. 9, 1954     2 Sheets-Sheet 2
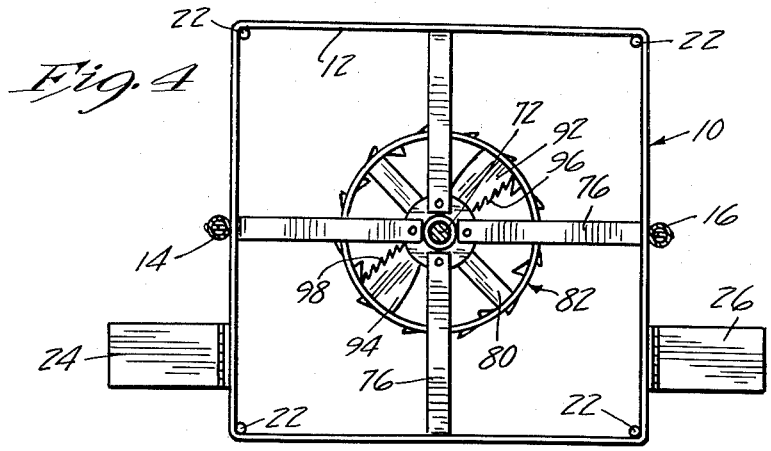
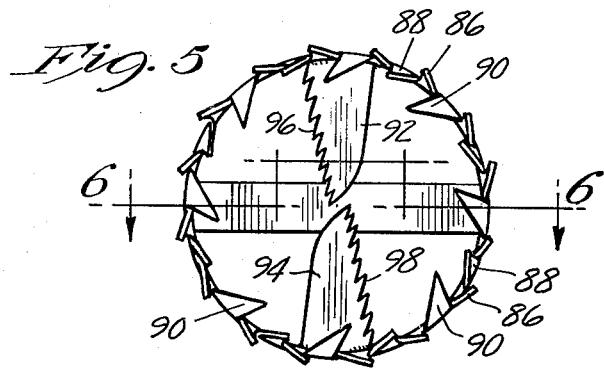
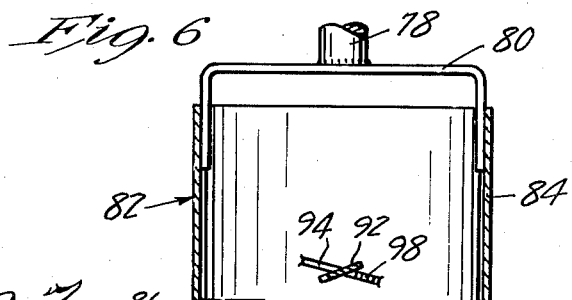
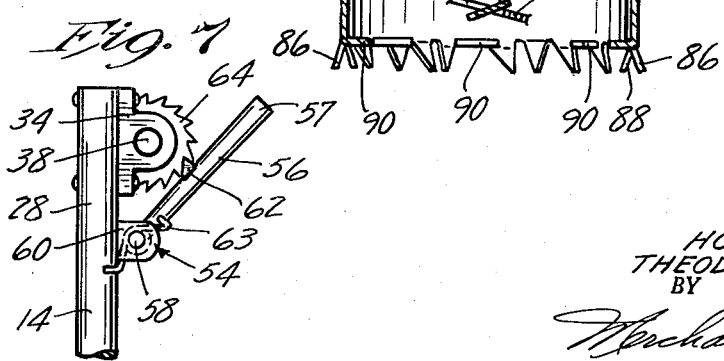
INVENTORS
HOWARD S. REESE
THEODORE E. PETERSON
BY
ATTORNEYS — 
United States Patent Office 2,723,835
Patented Nov. 15, 1955

2,723,835
ICE HOLE CUTTER
Howard S. Reese, Lafayette, and Theodore E. Peterson, Comfrey, Minn.

Application September 9, 1954, Serial No. 455,016

2 Claims. (Cl. 255—19)

Our invention pertains to an ice hole cutter. In particular it pertains to a motor-driven cutter for making cylindrical holes through the frozen surface of the lake.

An object of our invention is to provide a novel and improved ice hole cutter which is adapted to quickly and easily cut a proper sized hole for ice fishing in the frozen surface of a lake.

Another object of our invention is to provide a novel and improved motor-driven ice hole cutter which is supported on a frame provided with prongs adapted to be inserted in the ice, and a windlass adjacent the top part of the frame for raising the cutter from the ice hole after it has been cut.

Another object of our invention is to provide a novel and improved motor-driven ice hole cutter supported on a frame which rests on the top surface of the ice and having an improved cutting blade comprising, substantially vertically disposed teeth and symmetrically spaced horizontally disposed teeth positioned about the periphery of the lower edge of a cylinder, and two oppositely disposed substantially horizontal tooth blades secured to the wall of the cylinder and extending inwardly to the axis of the cylinder.

A further object of our invention is to provide a novel and improved motor-driven ice hole cutter which is supported on a frame, resting on the top surface of the ice and having prongs secured thereto adapted to be inserted in the ice, has cutting blades being driven by a shaft connected to the driving shaft of a motor which is secured to a platform carried by the frame for vertical movements with respect thereto, has a windlass journalled in the frame and having a hoisting rope secured to the platform for raising the platform and the parts associated therewith after the ice hole has been cut, and has a brake normally biased in braking relationship.

These and other objects will be disclosed in the course of the following specification and claims, reference being had to the accompanying drawings wherein:

Fig. 1 is a view in front elevation of our invention;

Fig. 2 is a view in side elevation of the structure shown in Fig. 1;

Fig. 3 is a fragmentary view of the lower portion of our invention in front elevation with some parts broken away showing the operating position of this portion of our invention;

Fig. 4 is a view in top plan taken along line 4—4 of Fig. 3 showing some parts in section;

Fig. 5 is a bottom plan view of the cutting blade of our invention;

Fig. 6 is a section view taken along the line 6—6 of Fig. 5; and

Fig. 7 is a fragmentary view in side elevation taken along line 7—7 of Fig. 1 showing the brake of our invention.

Referring more particularly to the drawings, reference numeral 10 designates a frame having a rectangular shaped enclosure member 12 and oppositely disposed rods 14 and 16 secured at their lower ends 18 and 20, respectively, to member 12. Secured in each corner of member 12 are prongs 22 which are adapted to be inserted in the ice as shown by dotted lines in Fig. 3. Hinged adjacent the bottom edge of member 12 are oppositely disposed flaps 24 and 26 on which the operator may stand to steady the frame 10 during the operation of our invention. Flaps 24 and 26 are maintained against the sides of member 10 as shown in Figs. 1 and 2 by a rod 27 having hooked ends 27a and 27b. Adjacent the upper ends 28 and 30 of rods 14 and 16 is journalled a windlass 32 by means of bracket members 34 and 36. Windlass 32 consists of a shaft 38 and an L-shaped handle portion 40. Secured on shaft 38 are spaced grooved wheels 42 and 44 on which the hoisting ropes 46 and 48 are wound. The upper ends 28 and 30 of rods 14 and 16 are supported by a brace 50. The lower ends of hoisting ropes 46 and 48 are secured to a platform 52 mounted on rods 14 and 16 for vertical movement with respect thereto. The upward movement of platform 52 is limited by collars 53 secured to rods 14 and 16; and the downward movement of platform 52 is normally prevented by means of brake 54, see Fig. 7.

Brake 54 consists of a rack 56 having a handle end 57 and pivotally connected at point 58 to ear 60 secured to rod 14. Rack 56 has a single tooth 62 which is normally biased by spring 63 into engagement with a detent gear 64 secured to the shaft 38.

Mounted on platform 52 is a gasoline motor 66 of the type commonly used in driving the propeller shaft of an outboard motor. A coupling 68 connects the driving shaft of motor 66, not shown in the drawings, to the upper end 70 of a shaft 72. Shaft 72 is journalled in a guide sleeve 74 which is secured to the frame 10 by angle brackets 76. Shaft 72 at its lower end 78 is connected as shown in Fig. 6 to a U-shaped brace 80 which is secured to a cutting blade 82. Cutting blade 82 is comprised of a cylinder 84 having disposed about the periphery of its lower edge teeth 86, which are positioned substantially vertically but inclined away from the axis of cylinder 84, teeth 88, which are positioned substantially vertically and inclined toward the axis of cylinder 84, and teeth 90, which are positioned substantially horizontally. Spaced upwardly from the lower edge of cylinder 84 are oppositely disposed blades 92 and 94 having toothed cutting edges 96 and 98, respectively.

The operation of our invention is as follows. Our device is positioned as shown in Fig. 1 when it has first been transported to the position at which an operator wishes to cut a hole through the frozen surface of a lake. The operator first presses down with his feet on the top edge of member 12 to insert prongs 22 into the ice as shown in Fig. 3. Hooked ends 27a and 27b of rod 27 are disengaged from flaps 24 and 26 so that the flaps may be permitted to lie flat on the top surface of the ice. The operator then stands on flaps 24 and 26 to steady the frame 10. The operator's feet are shown in dotted lines at 24a and 26a in Fig. 3. Motor 66 is now started in the usual manner which rotates shaft 72 and cutting blade 82. Brake 54 is released by moving downwardly on handle end 57 of rack 56, and this permits the weight of motor 66 and platform 52 to force the cutting teeth 86, 88 and 90 of blade 82 into the ice. Blades 92 and 94 core out the hole. When the hole has been completely cut through the surface of ice, the operator may release handle 57 of rack 56 and spring 63 forces tooth 62 into contact with gear 64 to brake the downward movement of platform 52. The motor 66 may now be stopped and platform 52 raised to its starting position by rotating handle 40 of windlass 32. Collars 53 limit the upward movement of platform 52. Brake 54 will maintain the upward movement of platform 52 at all times.

It will be obvious to those skilled in the art that our invention may be modified by many substitutions and equivalents and that this disclosure is intended to be illustrative only. Therefore, we intend to be limited solely by the scope of the attached claims.

What we claim is:

1. An ice hole cutter comprising a frame, a platform carried by said frame for vertical movement with respect thereto, a motor secured to said platform, a shaft vertically disposed with respect to the surface of the ice and adapted to be driven by said motor, and a cutting blade secured to the lower end of said shaft comprising a cylinder having its axis aligned with said shaft, substantially vertically disposed teeth and symmetrically spaced horizontally disposed teeth positioned about the lower edge of said cylinder, and two oppositely disposed substantially horizontal toothed blades secured to the wall of said cylinder and extending inwardly to the axis of said cylinder.

2. In a device of the class described, a frame, a shaft vertically aligned with respect to the surface of the ice carried by said frame for vertical and rotational movement with respect thereto, and a cutting blade secured to the lower end of said shaft and adapted to cut a hole in the ice comprising, a cylinder having its axis aligned with said shaft, substantially vertically disposed teeth symmetrically inclined toward and away from the axis of said cylinder and symmetrically spaced horizontally disposed teeth positioned about the lower edge of said cylinder, and two oppositely disposed substantially horizontal toothed blades spaced upwardly from the lower edge of said cylinder, said blades being secured to the wall of said cylinder and extending inwardly to the axis of said cylinder.

References Cited in the file of this patent

UNITED STATES PATENTS

| | | |
|---|---|---|
| 1,836,218 | Wright | Dec. 15, 1931 |
| 2,301,478 | Tribbals, Jr., et al. | Nov. 10, 1942 |
| 2,692,757 | Folstad | Oct. 26, 1954 |